US010903631B2

(12) United States Patent
Wicki

(10) Patent No.: US 10,903,631 B2
(45) Date of Patent: Jan. 26, 2021

(54) DEVICE AND METHOD FOR MANIPULATING AN INNER CONDUCTOR

(71) Applicant: komax Holding AG, Dierikon (CH)

(72) Inventor: Beat Wicki, Adligenswil (CH)

(73) Assignee: komax Holding AG, Dierikon (CH)

( * ) Notice: Subject to any disclaimer, the term of this patent is extended or adjusted under 35 U.S.C. 154(b) by 266 days.

(21) Appl. No.: 15/837,038

(22) Filed: Dec. 11, 2017

(65) Prior Publication Data

US 2018/0183222 A1 Jun. 28, 2018

(30) Foreign Application Priority Data

Dec. 22, 2016 (EP) .................................... 16206365

(51) Int. Cl.
*H01R 43/28* (2006.01)
*H01R 43/20* (2006.01)
*H02G 1/14* (2006.01)

(52) U.S. Cl.
CPC ............... *H02G 1/14* (2013.01); *H01R 43/28* (2013.01)

(58) Field of Classification Search
CPC .................................. H01R 43/28; H02G 1/14
USPC ......... 29/828, 857, 868, 874, 729, 700, 709, 29/748
See application file for complete search history.

(56) References Cited

U.S. PATENT DOCUMENTS

| 3,774,478 | A | * | 11/1973 | Carpenter | ............ | H02G 1/1295 |
| | | | | | | 81/9.51 |
| 3,891,013 | A | * | 6/1975 | Folk | ..................... | H01B 13/012 |
| | | | | | | 140/147 |
| 4,040,167 | A | * | 8/1977 | Jepson | ................. | H01R 43/052 |
| | | | | | | 29/564.4 |

(Continued)

FOREIGN PATENT DOCUMENTS

| CN | 1272675 A | 11/2000 |
| CN | 102640373 A | 8/2012 |

(Continued)

OTHER PUBLICATIONS

European Search Report in EP 16206365.5-1801, dated Jun. 7, 2017, with an English translation of relevant parts.

(Continued)

*Primary Examiner* — Peter Dungba Vo
*Assistant Examiner* — Kaying Kue
(74) *Attorney, Agent, or Firm* — Collard & Roe, P.C.

(57) ABSTRACT

A device and a method manipulate an inner conductor from several inner conductors at a stripped end of a sheathed cable. The device includes a manipulation device pivotable from an initial position about a pivot axis extending perpendicular to the axial direction of the cable end alignable relative to the manipulation device in a plane extending perpendicular to the cable end axis. The manipulation device includes a needle movable towards an inner conductor end in the initial position along a needle axis; and an inner conductor gripper gripping the inner conductor end. The (Continued)

method includes aligning the cable end relative to the manipulation device to align the needle axis with the inner conductor axis; moving the needle towards the inner conductor end, and establishing needle and inner conductor end contact; pivoting the manipulation device about the pivot axis; and gripping the inner conductor end by the inner conductor gripper.

8 Claims, 8 Drawing Sheets

(56) References Cited

U.S. PATENT DOCUMENTS

| | | | | |
|---|---|---|---|---|
| 4,183,383 | A * | 1/1980 | Gudmestad | H01R 43/28 140/105 |
| 4,188,702 | A * | 2/1980 | Herbert | H02G 1/1256 29/426.6 |
| 4,386,494 | A | 6/1983 | Felix | |
| 4,404,743 | A * | 9/1983 | Brandewie | H01R 43/28 29/857 |
| 4,647,323 | A * | 3/1987 | Darstein | H01R 43/28 156/50 |
| 4,653,182 | A * | 3/1987 | Fukuda | B23P 19/007 29/235 |
| 4,719,697 | A * | 1/1988 | Schwartzman | H01R 43/05 29/867 |
| 4,790,067 | A * | 12/1988 | Grindle | B23K 3/00 219/229 |
| 4,793,038 | A * | 12/1988 | Guerout | H01R 43/01 29/33 M |
| 4,860,801 | A * | 8/1989 | Nicholas | H01R 43/28 140/105 |
| 5,315,757 | A * | 5/1994 | Koch | H01R 43/005 29/743 |
| 5,615,478 | A * | 4/1997 | Celoudoux | H01R 43/28 29/845 |
| 5,655,293 | A * | 8/1997 | Celoudoux | H01R 43/28 29/33 M |
| 10,475,558 | B2 | 11/2019 | Dober | |
| 2001/0018980 | A1 | 9/2001 | Kunii et al. | |
| 2001/0035039 | A1* | 11/2001 | Ooji | H01R 43/055 72/420 |
| 2005/0050722 | A1* | 3/2005 | Viviroli | H01R 43/052 29/729 |
| 2005/0097734 | A1* | 5/2005 | Stocker | H01R 43/28 29/828 |
| 2007/0173122 | A1* | 7/2007 | Matsuoka | H01R 43/28 439/607.41 |
| 2012/0102733 | A1* | 5/2012 | Wild | H02G 1/14 29/857 |
| 2012/0267146 | A1 | 10/2012 | Petry et al. | |
| 2014/0115855 | A1* | 5/2014 | Angelov | H01R 43/28 29/407.01 |
| 2015/0104973 | A1* | 4/2015 | Manser | H01B 11/18 439/578 |
| 2016/0365178 | A1 | 12/2016 | Dober | |

FOREIGN PATENT DOCUMENTS

| | | |
|---|---|---|
| CN | 106253027 A | 12/2016 |
| DE | 39 34 401 A1 | 4/1991 |
| EP | 3 104 471 A1 | 12/2016 |
| JP | H02-89375 U | 7/1990 |
| JP | 2000-251548 A | 9/2000 |

OTHER PUBLICATIONS

Chinese Search Report in Chinese Application No. 2017113823299 dated Apr. 7, 2020 (with translation).

* cited by examiner

DEVICE AND METHOD FOR MANIPULATING AN INNER CONDUCTOR

CROSS REFERENCE TO RELATED APPLICATIONS

Applicant claims priority under 35 U.S.C. § 119 of European Application No. 16206365.5 filed Dec. 22, 2016, the disclosure of which is incorporated by reference.

BACKGROUND OF THE INVENTION

1. Field of the Invention

The invention relates to a device and a method for manipulating an inner conductor from a plurality of inner conductors at a stripped end of a sheathed cable.

2. Description of the Related Art

Electrical sheathed cables have a bundle of inner conductors, wherein the inner conductor bundle is surrounded overall by an electrically insulating material, the so-called sheath. The sheath forms an outer insulation layer. Each of the inner conductors is formed from individual strands which in turn are each surrounded by an electrically insulating material, typically a plastic insulation, as an inner insulation layer. The strands are, for example, twisted strands of copper or of aluminum.

Sheathed cables are often processed automatically, for example, in a stripping process, a re-cutting process, a crimping process, and the like. For the automatic processing of sheathed cables, it is expedient to hold the inner conductors individually and make them accessible.

An automatic separation process is performed with the help of a separation device. In a separation operation, the inner conductors can be inserted in a defined manner, for example, into a fastening device which serves as a holder for the further processing of the inner conductors.

A device and a method for separating inner conductors are known from US 2014/0115855 A1. The inner conductors are separated from each other by compressed air. An air nozzle is directed to apply an essentially perpendicular air flow to the stripped end of a sheathed cable, in which the inner conductors are exposed as a bundle.

Generally speaking, in the conventional method, but not in every case, the inner conductor is separated from the bundle of inner conductors or transferred into an angled course relative to the cable axis which is located farthest from the air nozzle. However, the separating behavior is undefined in the conventional method. Therefore, the conventional method results in the disadvantage that the inner conductors which are angled after the use of the air nozzle are undefined in the space. This makes a subsequent allocation of the inner conductors more difficult, for example, in order to transfer these individually and in a defined sequence into a suitable fastening device.

SUMMARY OF THE INVENTION

It is an object of the present invention to provide a device or a method for manipulating an inner conductor from a plurality of inner conductors at a stripped end of a sheathed cable wherein a defined inner conductor can be manipulated or separated and reliably associated.

The object is achieved by a device according to the features of one aspect of the invention or by a method according to the features of another aspect of the invention.

According to one aspect of the invention, a device for manipulating an inner conductor from a plurality of inner conductors at a stripped end of a sheathed cable has a manipulation device which is pivotable from an initial position about a pivot axis, wherein the pivot axis extends essentially perpendicular to the axial direction of the end of the sheathed cable, wherein the end of the sheathed cable is alignable relative to the manipulation device in a plane which is essentially perpendicular to the axis of the end of the sheathed cable; wherein the manipulation device has a needle which is movable in the initial position of the manipulation device along a needle axis towards one end of the inner conductor and an inner conductor gripper for gripping the end of the inner conductor.

According to another aspect of the invention, there is provided a method of manipulating an inner conductor from a plurality of inner conductors at a stripped end of a sheathed cable by means of a manipulation device, wherein the manipulation device has a needle which is movable in the initial position of the manipulation device along a needle axis towards one end of the inner conductor and an inner conductor gripper for gripping the end of the inner conductor. The method comprises aligning the end of the sheathed cable relative to the manipulation device such that the needle axis is aligned with the inner conductor axis of the inner conductor; moving the needle towards the end of the inner conductor and establishing mechanical contact between the needle and the end of the inner conductor; pivoting the manipulation device about a pivot axis, wherein the pivot axis extends essentially perpendicular to the axial direction of the end of the sheathed cable; and gripping the end of the inner conductor by means of the inner conductor gripper.

A sheathed cable having a plurality of inner conductors extends along a cable axis in a main extension direction of the cable. This cable axis defines the axial direction to which the cross-section of the sheathing cable or the bundle is defined perpendicularly to inner conductors. The cable axis of the sheathed cable extends centrally in the bundle of inner conductors.

The end of the sheathed cable is a region which forms an end region of the sheathed cable and which has a certain extension along the main extension direction. In this region, the sheathed cable typically extends in a straight line manner or essentially in a straight line manner.

The end of the sheathed cable is freed from the outer insulation (the sheath) i.e., so that the plurality of inner conductors—as a rule, with their respective inner insulation, which surrounds the individual strands of the inner conductors—is exposed. Each inner conductor typically extends at least in the region of the end of the sheathed cable in the cable axis or parallel to the cable axis. The inner conductor axis of an inner conductor thus extends at least in the end region in the axial direction of the cable axis of the sheathed cable, that is to say, in the cable axis of the sheathed cable or parallel to the cable axis of the sheathed cable.

In the initial position of the manipulation device, the needle axis of the needle extends approximately in the axial direction, i.e., approximately on the cable axis or parallel to the cable axis. The initial position corresponds to a non-pivoted position of the manipulation device. The needle is movable along the needle axis towards the end of an inner conductor from the plurality of inner conductors. The needle is thus movable in the longitudinal direction. The movement of the needle is typically movable by means of a drive of a suitable needle motor such that the needle is moved with a corresponding extension drive from an initial position of the needle towards the end of the inner conductor, and thus the needle is brought into an end position, and that the needle is moved back into the initial position from the end position with a corresponding retraction drive.

The end of the sheathed cable can be oriented relative to the manipulation device such that the needle axis of the needle of the manipulation device is aligned with the inner conductor axis of the inner conductor to be manipulated. Typically, such alignment occurs in either direction or in both directions in the plane on which the cable axis is essentially perpendicular.

When the needle is further moved towards the end of the inner conductor, mechanical contact is established between the needle and the end of the inner conductor. In other words: The needle sticks into the end of the inner conductor, typically between the strands of the inner conductor. At least in a movement in a direction which does not run in the needle axis, for example, in a direction transverse to the direction of the needle axis, the end of the inner conductor thus follows the movement of the needle.

The manipulation device is pivotable from the initial position about a pivot axis which extends essentially perpendicular to the axial direction of the end of the sheathed cable. The end of the inner conductor follows this pivoting movement as a result of the mechanical contact through the needle. The inner conductor can thus be manipulated in such a way that its end in question is pivoted out of the axial direction in a defined manner in a defined direction. The inner conductor can thus be separated reliably.

The inner conductor gripper of the manipulation device can securely grip the thus separated inner conductor, whereupon the needle can be retracted into its initial position. It can thus be ensured that the inner conductor gripper grips a specifically determined inner conductor from the plurality of inner conductors.

Advantageous further developments of the solution according to the invention are discussed below.

In embodiments, the device for manipulating an inner conductor further comprises a control device, an image capture device and an alignment device, wherein the image capture device is configured to capture an image of the end of the sheathed cable and to output the image to the control device, and wherein the alignment device is configured to receive an alignment signal from the control device and to align the end of the sheathed cable relative to the manipulation device based on the alignment signal. According to the embodiment, the control device is configured to generate the alignment signal using the image from the image capture device to cause the needle axis to align with the axial direction of the inner conductor.

The image capture device is, for example, a digital camera, which is inexpensive and readily available. Typically, the image capture device is oriented to detect an image in the plane perpendicular to the cable axis. The control device and the alignment device can be configured as separate controls or also as an integrated control. For example, the control device and/or the alignment device is configured as a standard computer, as an industrial computer, as an integrated circuit or the like.

The control device is suitably connected to the image capture device and configured to evaluate a received image or sequence of images received from the image capture device. One possibility for evaluation is a suitable image analysis method. The control device generates an alignment signal based on the evaluation to cause the needle axis to be aligned with the inner conductor axis of the inner conductor.

The control device is configured to output the alignment signal to the alignment device. The alignment device is, for example, a control device for driving a motor or a plurality of motors which are provided on the device for manipulating the inner conductor and which are mechanically connected to the device for manipulating the inner conductor in such a way that they can execute a movement suitable for aligning the needle axis.

In embodiments, the control device is further configured to select a previously determined or determinable inner conductor from the plurality of inner conductors. For example, an inner conductor to be manipulated is preselected and determined as the inner conductor whose inner conductor axis is to be aligned with the needle axis.

In embodiments, the device further has a rotation device for rotating, typically for selective rotation, a fastening device for the inner conductor of the sheathed cable.

With respect to the method, this further comprises, in embodiments, selecting a previously determined or determinable inner conductor from the plurality of inner conductors and rotating, typically selectively rotating, a fastening device for the inner conductor of the sheathed cable, taking into account the selected inner conductor.

For example, the control device determines, from the captured image of the image capture device, which inner conductor is located at a defined position, for example, which inner conductor is located at the top. The fastening device is subsequently rotated in such a way that a holding device of the fastening device of the determined inner conductor is located in the region of the defined position.

The determined inner conductor can then be introduced into the associated holding device of the fastening device. In embodiments, the method comprises placing the end of the inner conductor into the holding device of the fastening device.

In embodiments, the introduction according to the method of the end of the inner conductor into the holding device further comprises pivoting the manipulation device about the pivot axis into an end position such that the end of the inner conductor is brought into the region of the holding device of the fastening device; and moving the end of the inner conductor relative to the holding device to a holding position for the end of the inner conductor.

In embodiments, the device further comprises a collection gripper for gripping a plurality of the inner conductors, typically for gripping all inner conductors, at the end of the sheathed cable. The collection gripper is configured, for example, such that it can be closed and opened in a controllable manner. The closing and opening of the collection gripper can be effected by means of a pneumatic drive, an electric drive or another suitable drive. For example, the closing force of the collection gripper is adjustable. The collection gripper can also have an intermediate position between the open state and the closed state, wherein in the intermediate position, it is possible for an inner conductor to be pivoted or bent away, wherein the remaining inner conductors are also securely surrounded by the collection gripper.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
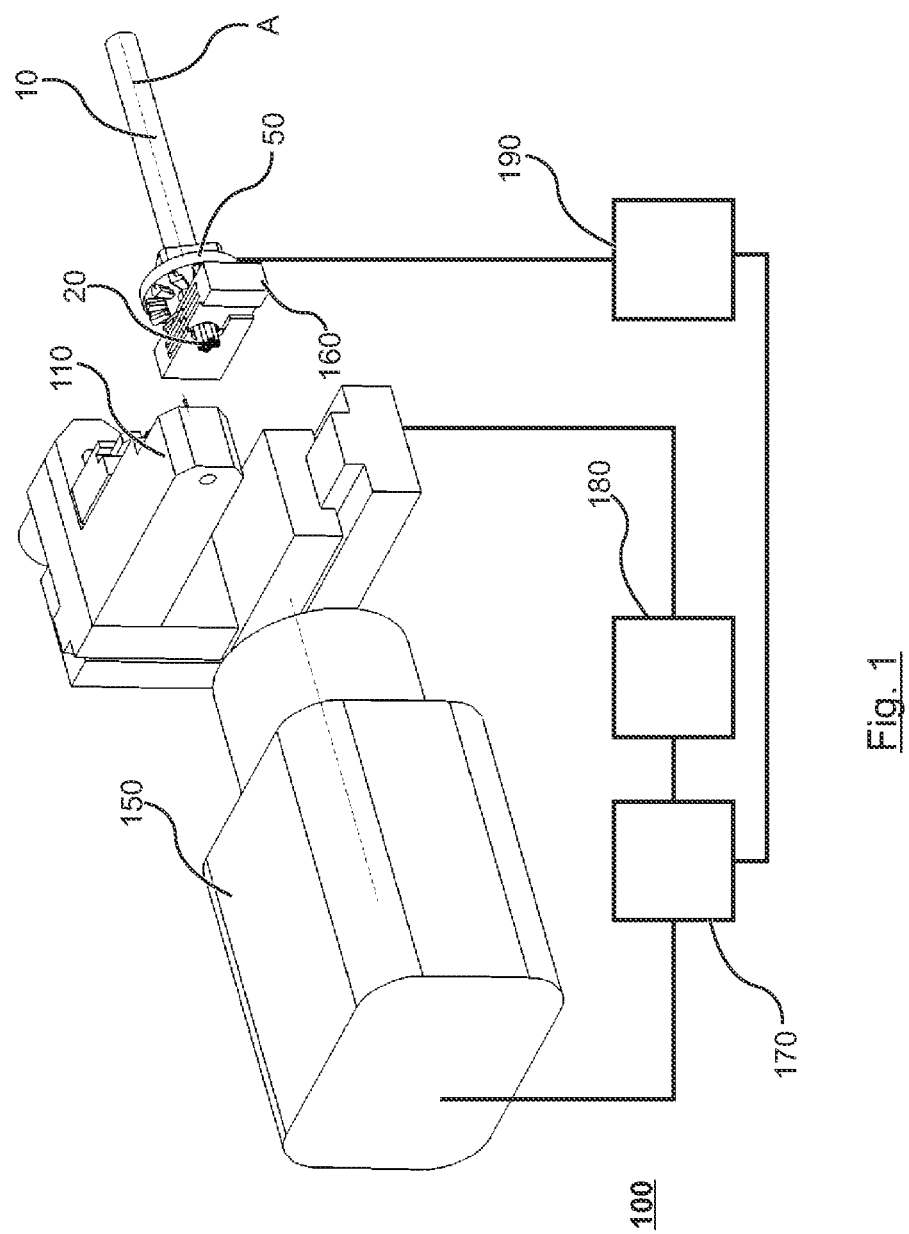
FIG. 1 is a perspective schematic view of a device for manipulating an inner conductor from a plurality of inner conductors at a stripped end of a sheathed cable according to an embodiment of the invention.

FIG. 1 shows a perspective schematic view of a device 100 for manipulating an inner conductor 20 from a plurality of inner conductors 20 on a stripped end of a sheathed cable 10 according to an embodiment of the invention. Insofar as the explanation does not depend on a distinction of the individual inner conductors in the bundle of inner conductors, an inner conductor is provided with the reference symbol 20. The sheathed cable 10 extends essentially linearly along a cable axis which defines an axial direction A. Each inner conductor 20 on the stripped end of the sheathed cable 10 also extends in a straight line along an inner conductor axis and parallel to the cable axis in FIG. 1, which shows the state before a manipulation operation of the inner conductor 20.

The sheathed cable has an end, on which the outer insulation—the sheath—of the sheathed cable 10 is removed and the inner conductors 20 are exposed. Each inner conductor 20 is formed from a twisted strand bundle of aluminum strand or copper strand, which is surrounded by an inner conductor insulation. The invention is not limited to internal conductor 20 with strand, and other internal conductors 20 may also be used in a different way with the fastening device according to the invention.

The end of the sheathed cable is passed through a pass-through opening of a fastening device 50 and is held by means of two gripping jaws of a collection gripper 160. The fastening device is explained in detail later with reference to FIGS. 3 and 4. The collection gripper 160 is, for example, controllable pneumatically or electrically such that it can be brought from an open position into the closed position shown in FIG. 1 and can, with its gripping jaws, surround and hold the bundle of inner conductors.

Figure 12:
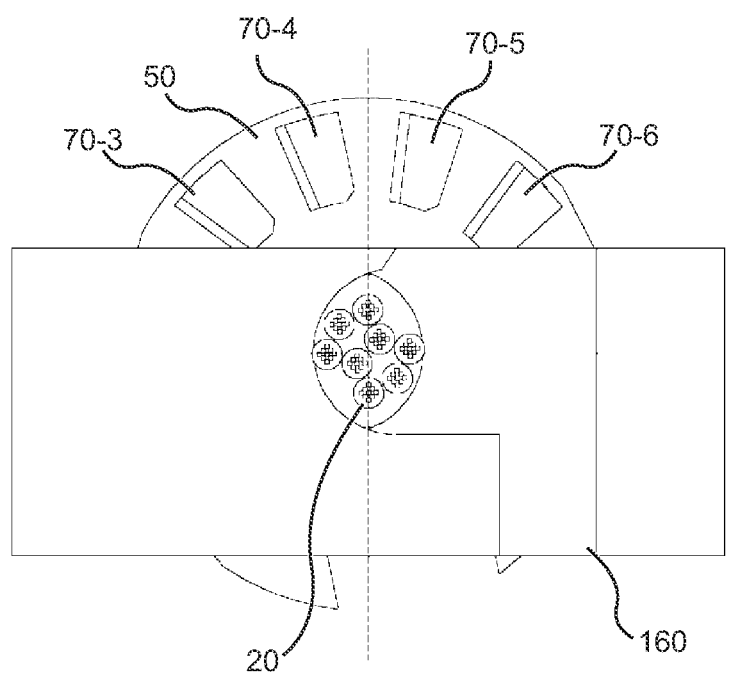
FIG. 12 is a plan view of parts of the device of FIG. 1.

A digital camera as an image capture device 150 is arranged to capture an image of the bundle of inner conductors 20. In the embodiment shown in FIG. 1, an image axis of the digital camera extends in the axial direction, i.e., parallel to the cable axis, or the image axis coincides with the cable axis. An example of an image which the digital camera captures is shown in FIG. 12.

A manipulation device 110, which has an inner conductor gripper 111, to be described later, is arranged between the image capture device 150 and the arrangement of the collection gripper 160, the fastening device 50 and the sheathed cable 10, and is movable in a plane perpendicular to the axial direction in a combination of a vertical traversing device 113 and a horizontal traversing device 114 (see FIG. 2).

The image capture device 150 is connected to a control device 170, which in turn is connected to an alignment device 190 and a rotation device 190. The alignment device 180 serves to drive the vertical traversing device 113 and the horizontal traversing device 114, while the rotation device 190 can effect a selective (controllable) rotation of the fastening device 50 about the axial direction.

Figure 2:
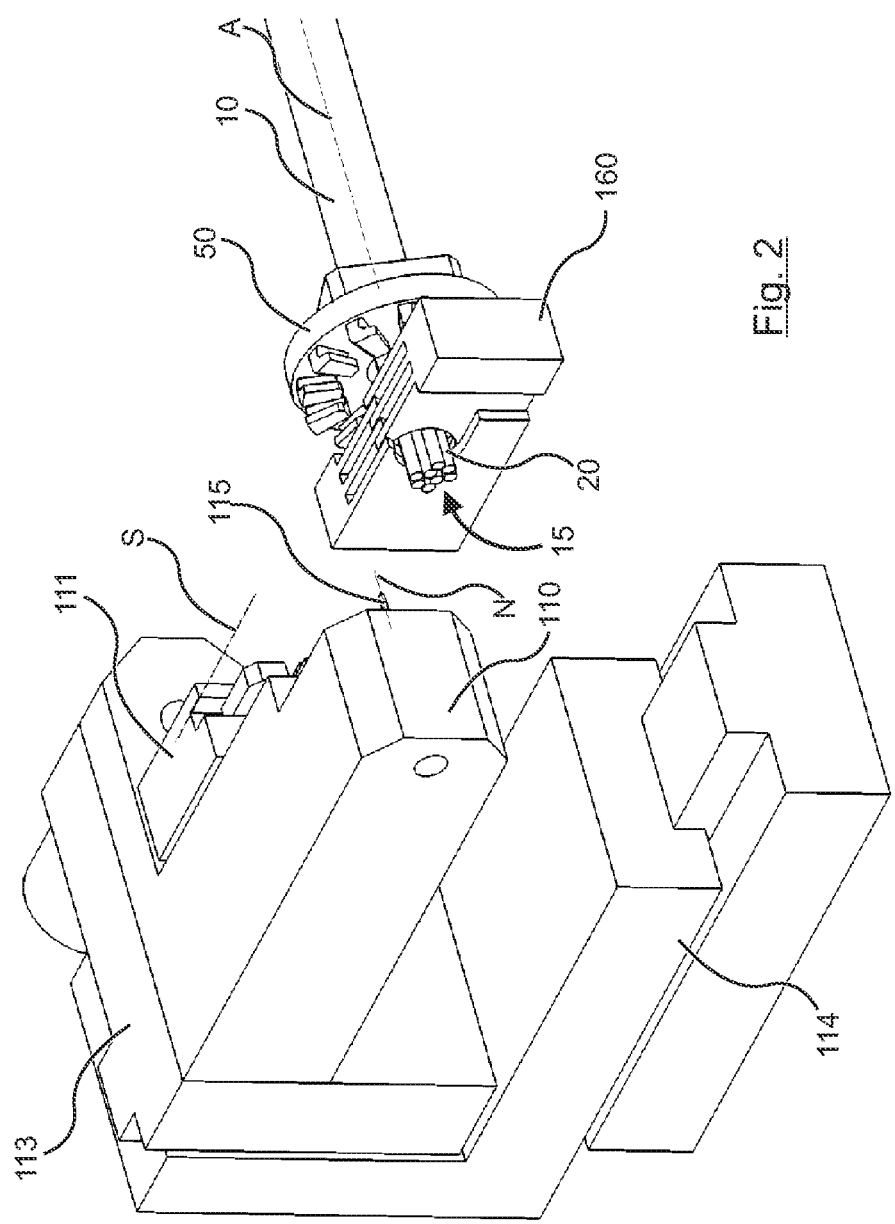
FIG. 2 is a perspective schematic view of details of the device from FIG. 1.

In FIG. 2, the arrangement of the manipulation device 110 relative to the collection gripper 160, the fastening device 50 and the sheathed cable 10 is shown in more detail. The end of the sheathed cable is designated as a whole by 15.

The manipulation device 110 is pivotable about a pivot axis S. The pivot axis S extends essentially perpendicular to the axial direction of the sheathed cable. In the illustration according to FIG. 2, the manipulation device 110 is located in an initial position, i.e., in a non-pivoted position. The manipulation device 110 has a needle 115 which is movable linearly along its needle axis N, for example, by means of a suitable electric motor, which can be controlled accordingly. In the initial position of the manipulation device 110, the needle axis N of the needle 115 extends approximately in the axial direction. In a corresponding extension drive, the needle 115 is moved from the initial position of the needle shown in FIG. 2 towards the end of the inner conductor 20 and thus brought into an end position of the needle. Correspondingly, the needle 115 is moved back from the end position into the initial position with a corresponding retraction drive.

Figure 3:
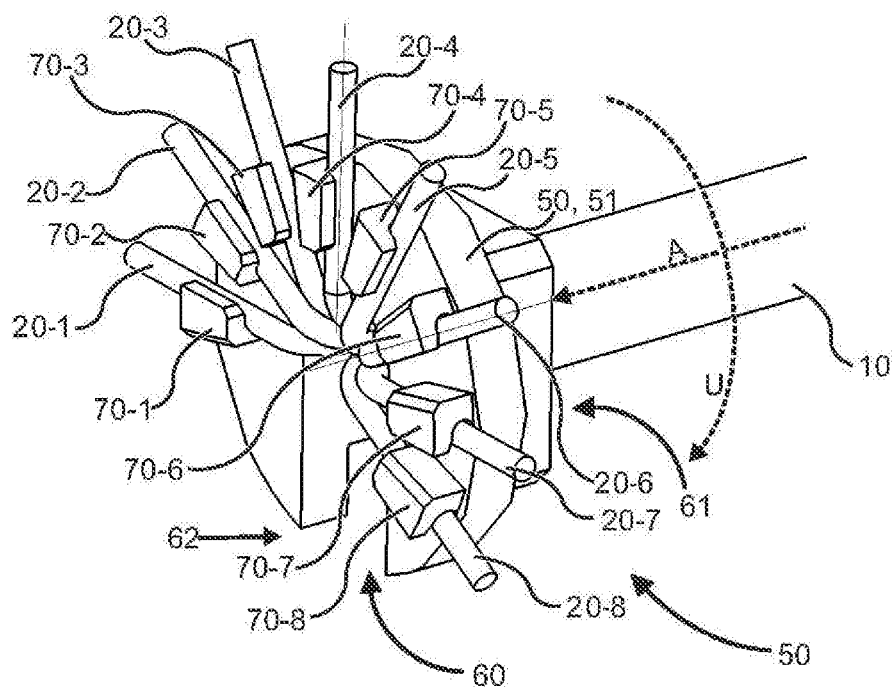
FIG. 3 is a perspective view of a fastening device for the inner conductors at a stripped end of a sheathed cable which can be used on a manipulation device according to an embodiment of the invention.
Figure 4:
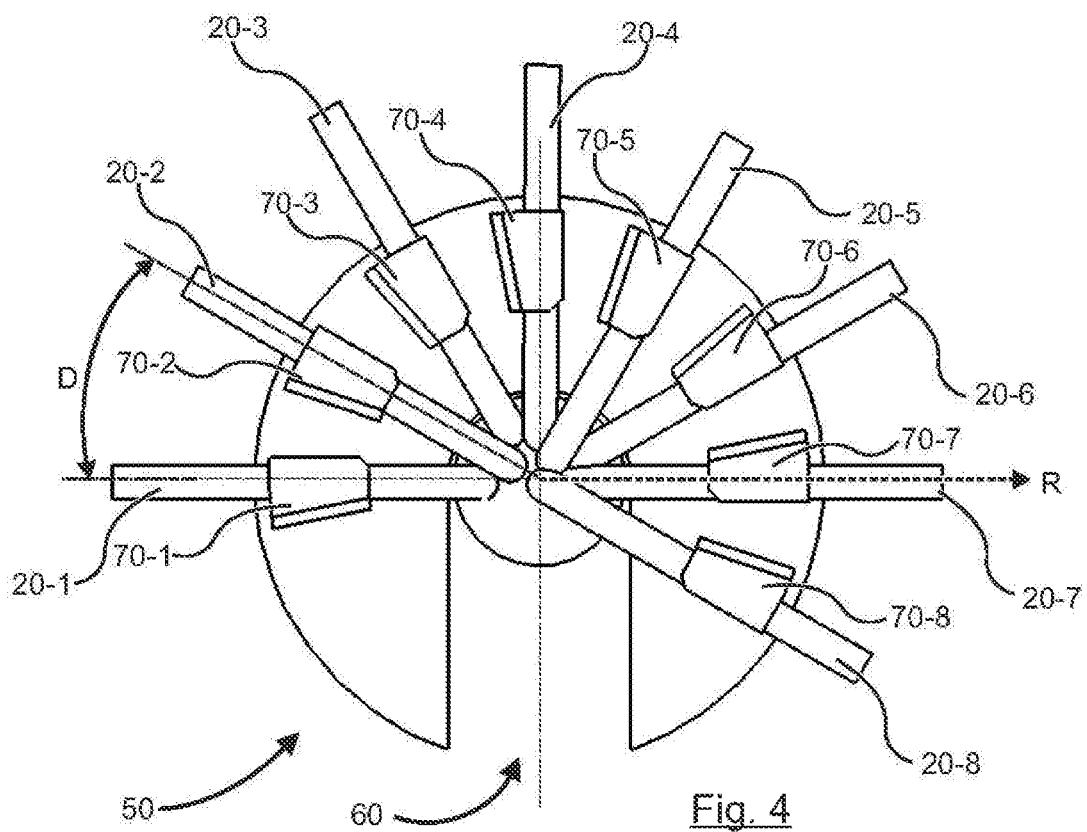
FIG. 4 is a plan view of the fastening device from FIG. 3.

FIG. 3 and FIG. 4 show the fastening device 50 for the inner conductors 20 in a more detailed manner. The fastening device 50 is usable on the device for manipulating according to the embodiments of the invention described herein.

The fastening device 50 illustrated by way of example is designed for a sheathed cable 10 having eight inner conductors 20-1 . . . 20-8 or for a sheathed cable having up to eight inner conductors 20-1 . . . 20-8. However, the invention is not limited to this number of inner conductors, and it also includes fastening devices 50 which are designed for fewer or more than eight inner conductors 20.

A pass-through opening 60 is configured in a plate 51 of the fastening device 50, the pass-through opening being configured as an insertion slot in the illustrated embodiment. In the embodiment, the insertion slot is formed by a circular opening, which is circular in the plate 51, the insertion slot being extended in the radial direction, so that the plate 51 has approximately the shape of a large C in the cross-section. A sheathed cable is slid along its axis which defines the axial direction A from the inlet side 61 through the pass-through opening 60 or is put into the inlet slot so that it enters the pass-through opening 60 on the inlet side 61. Correspondingly, the sheathed end 15 of the sheathed cable 10 emerges on the outlet side 62 of the insertion opening.

The fastening device 50 has holding devices 70, wherein a total of eight holding devices 70-1 . . . 70-8 are shown again as a non-limiting example. In the illustration according to FIG. 2, the inner conductors 20-1 . . . 20-8 of the sheathed cable 10 are respectively fastened or held in an associated holding device 70-1 . . . 70-8. The illustration according to FIG. 2 thus shows a state in which the inner conductors of a sheathed cable 10 have already been separated and are arranged on a respective associated or assigned holding device 70-1 . . . 70-8 of the fastening device 50. The individual holding devices 70-1 . . . 70-8 are configured as claws in the embodiment shown, which is explained later.

The holding devices 70-1 . . . 70-8 are arranged radially around the pass-through opening 60 on a circular arc, as can be seen better from the plan view of FIG. 4. Adjacent holding devices 70-1 . . . 70-8, except for the pair of outer holding devices 70-8 to 70-1, are arranged at an equal angular distance D from each other. In other words: The inner adjacent holding devices 70-1 . . . 70-8 are arranged equidistantly. For the sake of simplicity, only the angular distance D between the holding device 70-1 and the holding device 70-2 adjacent to it is shown in the illustration in FIG. 3; the same angular distance D is also present in the further inner adjacent pairs of holding devices, namely in the case of pairs 70-2 to 70-3, 70-3 to 70-4, 70-4 to 70-5, 70-5 to 70-6, 70-6 to 70-7 and 70-7 to 70-8.

The holding devices 70-1 . . . 70-8 can also be arranged offset in the radial direction R. A staggered arrangement does not exclude an equidistant arrangement of the holding devices 70-1 . . . 70-8 as explained herein.

The inner conductors 20-1 . . . 20-8 are insertable into an associated holding device 70-1 . . . 70-8. With the radial arrangement of the holding devices 70-1 . . . 70-8, all inner conductors 20-1 . . . 20-8 arranged in the respective holding devices 70-1 . . . 70-8 can have the same length. Furthermore, it is sufficient for the stripped end 15 of the sheathed cable 10, i.e., the part at which the outer insulation is removed, to be relatively short.

Figure 5:
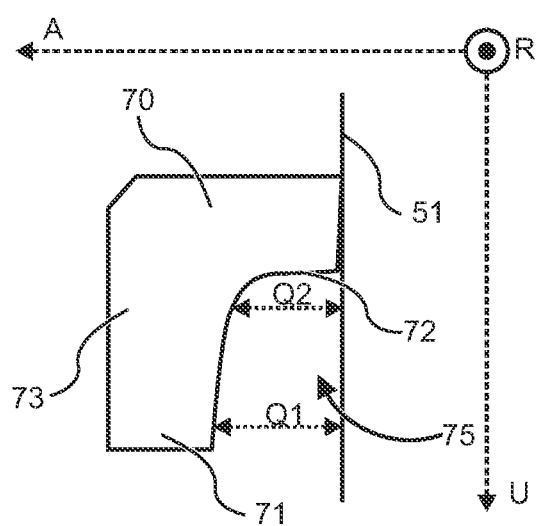
FIG. 5 is a schematic plan view of an exemplary holding device on the fastening device from FIGS. 4 and 5.

The holding devices 70 are each configured as claws 71, as is shown in detail in FIG. 5. FIG. 5 in this case shows a schematic plan view of the claw 71 in a plane as viewed in the radial direction R.

Typically, an inner conductor 20 may be clamped under a claw 71 and thus be secured to the claw 71 in a simple and effective manner. Also, a claw shape is advantageous in automated handling, in particular automated separation, of inner conductors as described herein. When an inner conductor 20 is brought into the region in front of the claw 71 in the course of a process described herein, the fastening device 50 is rotated in the corresponding direction to fasten the inner conductor 20 in the claw 71.

The claw 71 has a contact surface 72 for the inner conductor 20, wherein the contact surface 72 extends essentially in the axial direction A. A course in the axial direction denotes the main direction of extension of the contact surface 72 and does not exclude a curvature of the contact surface 72, as explained further below.

Furthermore, the claw 71 has a projection 73. The projection extends in the radial direction R. In turn, a course in the radial direction indicates the main direction of extension of the projection 73, and does not exclude a curvature of the projection.

The contact surface 72 and the projection 73 define a receiving region 75 for the inner conductor 20. As shown in the example in FIG. 5, the projection 73 is shaped in such a way that the receiving region 75 tapers starting from the open side to the contact surface 72 in its cross-section. It is shown by way of example in FIG. 5 that the cross-section Q1 is larger in the region of the open side than the cross section Q2 in the region of the contact surface 72. In addition, the cross-section in the example of FIG. 5 extends curved. The curvature can also approximately have a circular arc shape.

Varying outer diameters of the inner conductors 20 to be accommodated in the receiving region 75 are possible by such shaping, while at the same time increasing reliability for the fastening of the inner conductor 20 in the receiving region 75.

However, the holding devices 70 are not limited to a claw shape. For example, it is conceivable that at least one holding device 70 comprises a gripping element. Typically, all of the holding devices 70 each include a gripping element. A gripping element can be configured as a gripper having an active actuating element for the active opening of the gripping element when the inner conductor 20 is inserted. For example, a spring element serves as a restoring element for the subsequent closing of the gripping element.

It is also conceivable for at least one holding device 70 to include an axial clamping device. Typically, all holding devices 70 each include an axial clamping device. An axial clamping device or each axial clamping device is arranged to hold clamped an inserted inner conductor 20 when subjected to a force in the axial direction A. Typically, the force in the axial direction A acts counter to the direction of insertion or direction of passage of the end 15 of the sheathed cable 10. In other words: It is conceivable for the, for example, claw-shaped axial clamping device to be configured such that an inserted inner conductor 20 is pressed or clamped in the direction of the axis of the sheathed cable 10 into the axial clamping device for fastening or holding.

The fastening device 50 can also have a positioning element, for example a square part or the like. This positioning element allows a rotation to act on the rotation device 190 so that the radial orientation of the fastening device 50 is altered or rotated in a simple manner. For example, with the aid of the positioning element, the fastening device 50 is continuously rotatable, or is rotatable in steps which correspond to the angular division or the angular distance or the half angular division or the half angular distance of the holding devices 70. Rotability here refers to a rotation about the axis or a rotation in the plane in which the outlet side 62 of the pass-through opening 60 is located.

A method according to an embodiment of the invention is described in more detail below with reference to FIGS. 6 to 11.

In the initial position of the manipulation device 110, the image capture device 150 detects an image which corresponds approximately to that of FIG. 12. Possibly, the manipulation device 110 is moved out of the detection region with the help of the vertical traversing device 113 and/or the horizontal traversing device 114 for image capture. The collection gripper 160 can be seen in FIG. 12, the collection gripper surrounding a bundle of inner conductors 20, and some holding devices 70-3, 70-4, 70-5, 70-6 of the fastening device 50. The end 15 of the sheathed cable 10, i.e., the exposed inner conductor 20, is guided through the pass-through opening 60 of the fastening device 50. The insulations of the inner conductors 20 are, for example, different in color and the image capture device 150 is a color camera. For example, the individual inner conductors 20 can be identified.

A control software running in the control device 170 decides which inner conductor 20 is to be introduced next into a predetermined holding device 70 of the fastening device 50. In the embodiment shown, the manipulation device 110 is pivoted upwards about the pivot axis S. Therefore, it is advantageous if the rotation device 190, in addition to a rotation of the fastening device 50, can also cause a rotation of the end 15 of the sheathed cable 10. However, it is also conceivable to rotate the entire manipulation device 110 about the cable axis.

The control device 170, by means of the rotation device 190, causes the fastening device 50 to be rotated such that the holding device 70 which corresponds to the inner conductor 20 to be selected and manipulated is in a defined position, which after a pivoting movement of the manipulation device 110, makes it possible for the relevant inner conductor 20 to be introduced into the associated holding device 70.

The control device 170 determines the exact position of the selected and to be manipulated inner conductor 20 to position the needle 150. In the illustrated embodiment, for the positioning, the manipulation device 110 is movable in the plane perpendicular to the axial direction A by means of the vertical traversing device 113 and the horizontal traversing device 114. However, it is also possible that, alternatively or additionally, the end 15 of the sheathed cable 10 is movable together with the fastening device 50 and a collection gripper 160, if present, in the plane perpendicular to the axial direction A.

Figure 6:
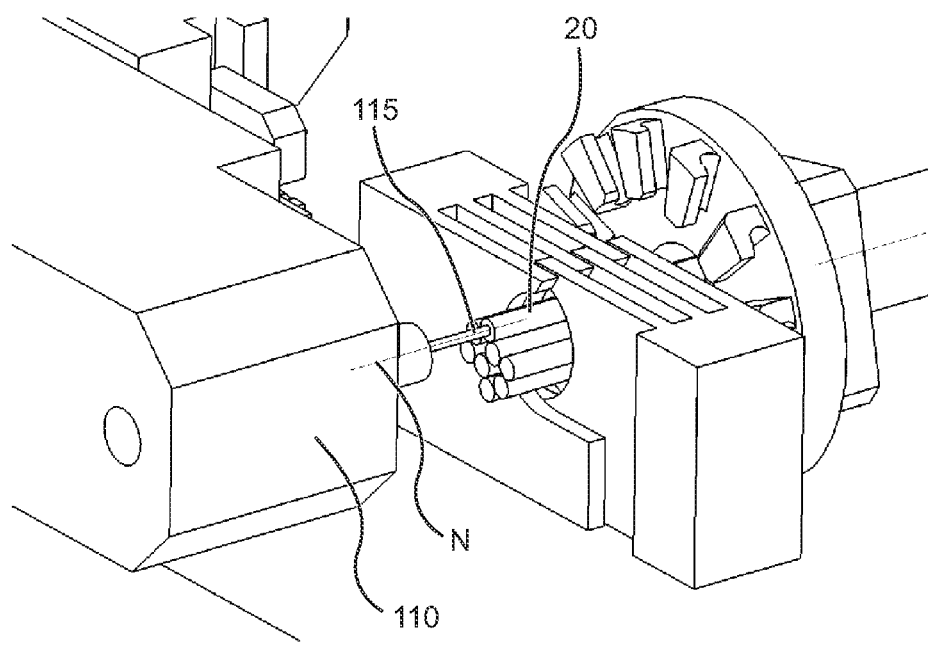
FIG. 6 is a perspective schematic view of details of the device of FIG. 1 in carrying out a method according to the invention.

In the view of FIG. 6, the needle 115 has been moved along the needle axis N between the strands of the selected inner conductor 20 so that mechanical contact is established between the needle 115 and the inner conductor 20. The needle 115 thus extends and sticks between the strands in the inner conductor 20. The bundle of inner conductors 20 is placed in the closed collection gripper 160.

Figure 7:
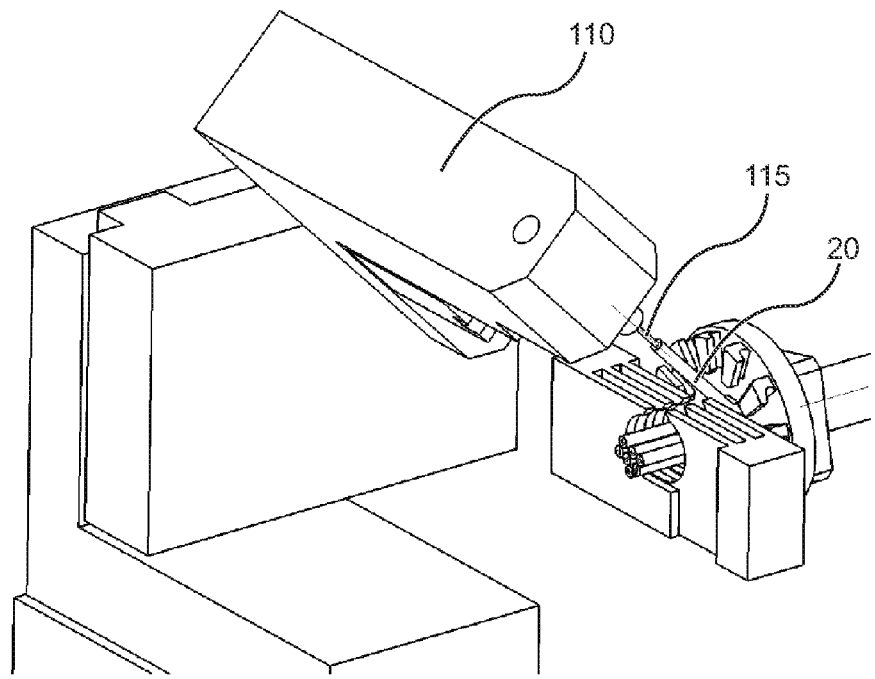
FIG. 7 is a perspective schematic view of details of the device of FIG. 1 in carrying out a method according to the invention.

As shown in FIG. 7, the collection gripper 160 is somewhat opened (put into an intermediate position). Subsequently, the manipulation device 110 is pivoted by a first angular amount, whereby the inner conductor 20 is bent. In the illustration in FIG. 7, the inner conductor 20 is bent upwards.

Figure 8:
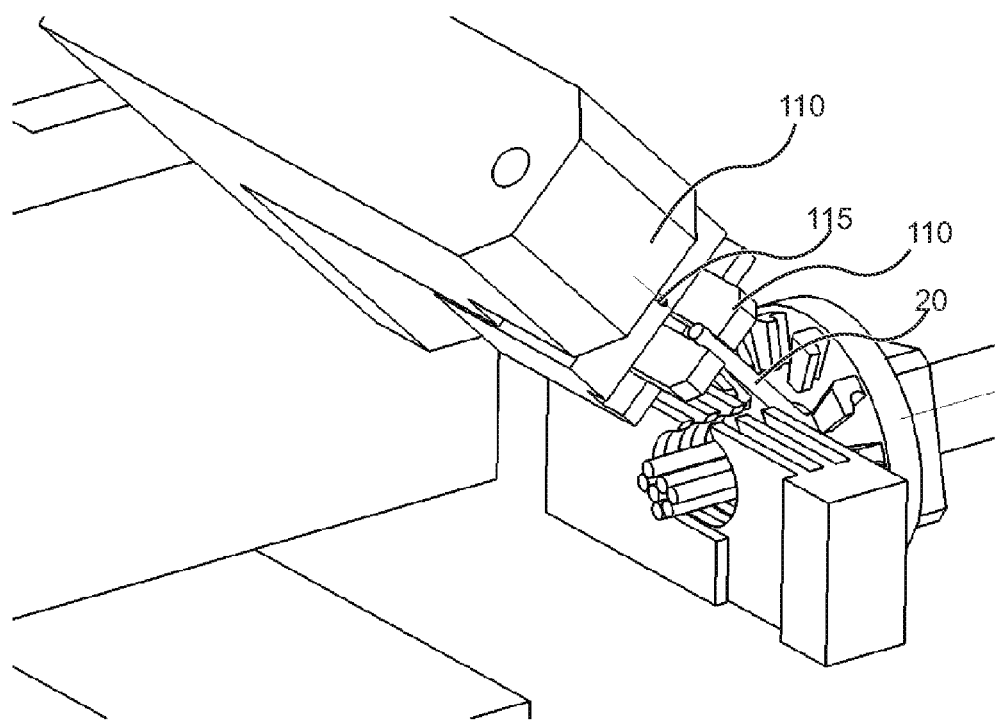
FIG. 8 is a perspective schematic view of details of the device of FIG. 1 in carrying out a method according to the invention.

In FIG. 8, the inner conductor gripper 111 is extended and grips the separated inner conductor 20. The needle 115 is in the retracted position. Typically, the needle 115 is brought into the retracted position after the inner conductor gripper 111 of the separated inner conductor 20 has gripped.

Figure 9:
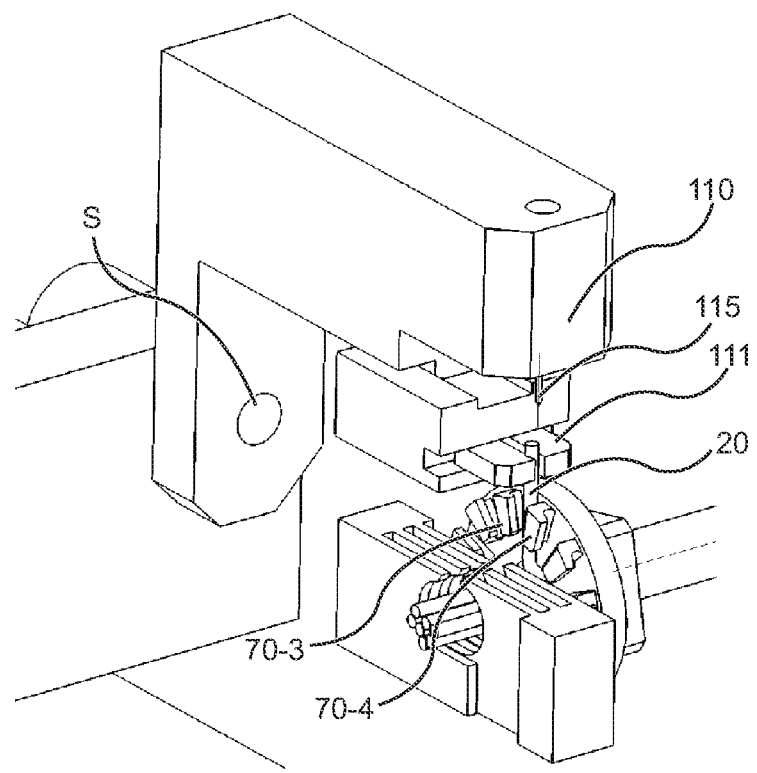
FIG. 9 is a perspective schematic view of details of the device of FIG. 1 in carrying out a method according to the invention.

Subsequently, the manipulation device 111 is pivoted further in the direction of the end position. In FIG. 9, the manipulation device 111 is pivoted to such an extent that the gripped inner conductor 20 extends approximately perpendicularly to the axial direction A. The inner conductor 20 is at an angle of approximately 90° from the axial direction A and extends at least approximately in the radial direction. For example, the inner conductor should be inserted into the holding device 70-3. The inner conductor 20 is located between the holding devices 70-3 and 70-4 in the example shown in FIG. 9.

Figure 10:
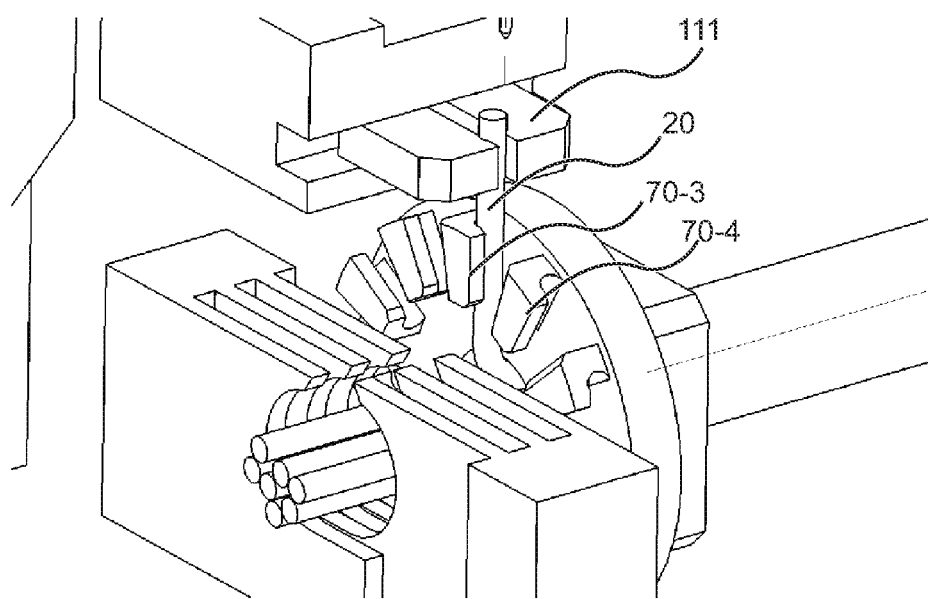
FIG. 10 is a perspective schematic view of details of the device of FIG. 1 in carrying out a method according to the invention.

In FIG. 10, the fastening device 50 has been further rotated, so that the inner conductor 20 has been inserted into the holding device 70-3. The separated inner conductor 20 has thus been clamped under the desired claw 71 in the example. Subsequently, the inner conductor gripper 111 is opened again.

Figure 11:
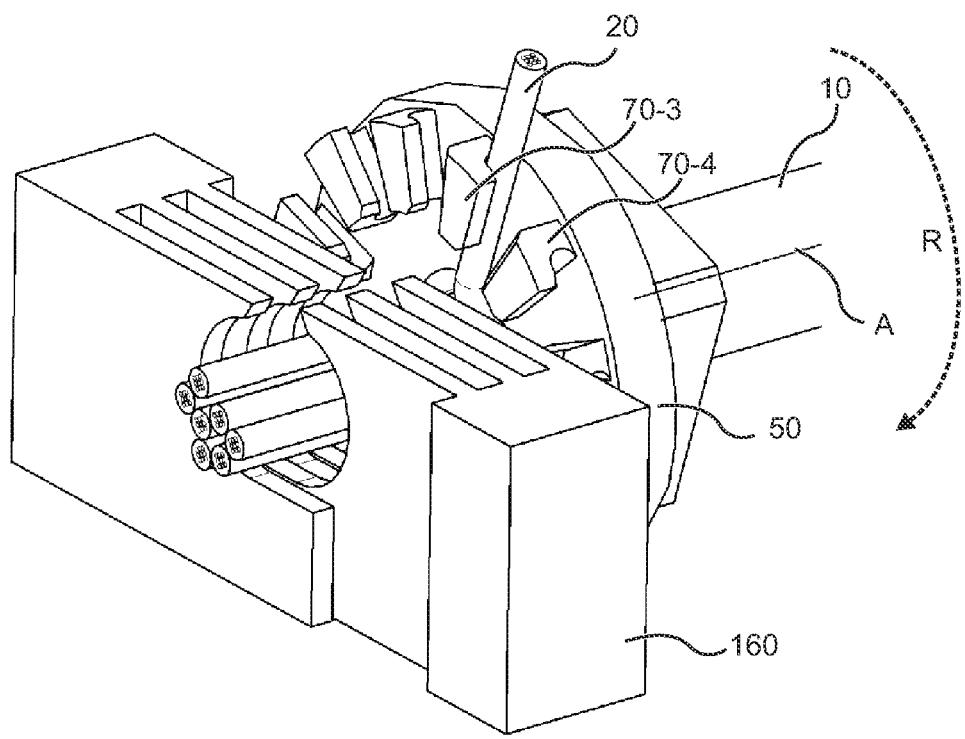
FIG. 11 is a perspective schematic view of details of the device of FIG. 1 in carrying out a method according to the invention.

In FIG. 11, the end 15 of the sheathed cable 10 and the fastening device 50 are rotated synchronously about the angular separation (the angular distance D) of the holding devices 70, i.e., the angle between two adjacent claws 71. Subsequently, the method as described herein may be repeated to manipulate another inner conductor 20.

The invention is not limited to a fastening device 50, shown by way of example, having a radial arrangement of the holding devices 70. It is also conceivable to equip a fastening device with separate inner conductors with the aid of the device 100, in which the inner conductors are arranged parallel to each other. For example, such a parallel fastening device could be arranged at right angles to the cable plane and, after assembly, can be pivoted together with the inner conductors into the cable plane.

Components also included in this disclosure are the following numbered aspects:

Aspect 1: A fastening device (50) for the inner conductor (20, 20-1 ... 20-8) on a stripped end (15) of a sheathed cable (10), comprising a pass-through opening (60) having an inlet side (61) and an outlet side (62) for conducting the end (15) of the sheathed cable (10) in an axial direction (A); a plurality of holding devices (70, 70-1 ... 70-8) for holding, in each case, an inner conductor (20, 20-1 ... 20-8) which are arranged radially on the outlet side (62) of the pass-through opening (60) around the pass-through opening.

Aspect 2: The fastening device (50) according to aspect 1, wherein the holding devices (70, 70-1 ... 70-8) are arranged equidistantly around the feed-through opening (60) on the outlet side (62).

Aspect 3: The fastening device (50) according to one of aspects 1 or 2, wherein the pass-through opening (60) is configured essentially centrally in the fastening device (50).

Aspect 4: The fastening device (50) according to one of the aspects 1 to 3, wherein at least one holding device (70, 70-1 ... 70-8), typically all holding devices (70, 70-1 ... 70-8), each include a claw (71).

Aspect 5: The fastening device (50) device according to aspect 5, wherein the claw (71) comprises a contact surface (72) running in the axial direction (A) and a projection (73) running in the radial direction (R), which define a receiving region (75) for the inner conductor.

Aspect 6: The fastening device (50) according to aspect 5, wherein the receiving region (75) has a cross-section (Q1, Q2) tapering in the direction of the contact surface (72).

Aspect 7: The fastening device (50) according to aspect 6, wherein the cross-section (Q1, Q2) extends curved, typically as a circular arc.

Aspect 8: The fastening device (50) according to one of aspects 1 to 3, wherein at least one holding device (70, 70-1 ... 70-8), typically all holding devices (70, 70-1 ... 70-8), each include an axial clamping device, wherein the axial clamping device is arranged to hold an inserted inner conductor (20, 20-1 ... 20-8) clamped in the axial direction (A) when subjected to a force.

Aspect 9: The fastening device (50) according to one of aspects 1 to 8, wherein at least one holding device (70, 70-1 ... 70-8), typically all holding devices (70, 70-1 ... 70-8), each include a gripping element (71).

Aspect 10: The fastening device according to one of aspects 1 to 9, which further comprises a positioning element for varying the radial orientation of the fastening device.

What is claimed is:

1. A device for manipulating an inner conductor from a plurality of inner conductors at a stripped end of a sheathed cable comprising:
   a manipulation device which is pivotable from an initial position around a pivot axis, wherein the pivot axis extends essentially perpendicularly to the axial direction of the end of the sheathed cable,
   a controller;
   an image capture device which is configured to capture an image of the end of the sheathed cable, and outputting the image to the controller; and
   an alignment device which is configured to receive an alignment signal from the controller and to align the end of the sheathed cable relative to the manipulation device based on the alignment signal,
   wherein the end of the sheathed cable is alignable relative to the manipulation device in a plane which is essentially perpendicular to the axis of the end of the sheathed cable;
   wherein the manipulation device comprises:
      a needle which is movable towards an end of the inner conductor along a needle axis in the initial position of the manipulation device; and
      an inner conductor gripper for gripping the end of the inner conductor; and
   wherein the controller is configured to generate the alignment signal using the image from the image capture device to cause the needle axis to be aligned with the inner conductor axis of the inner conductor.

2. The device according to claim 1, wherein the controller is further configured to select a previously determined or determinable inner conductor from the plurality of inner conductors.

3. A method for manipulating an inner conductor from a plurality of inner conductors at a stripped end of a sheathed cable by means of a manipulation device, wherein the manipulation device comprises a needle which is movable in the initial position of the manipulation device towards the end of the inner conductor along a needle axis, and an inner conductor gripper for gripping the end of the inner conductor, wherein the method comprises:
   aligning the end of the sheathed cable relative to the manipulation device such that the needle axis is aligned with the inner conductor axis of the inner conductor;
   moving the needle towards the end of the inner conductor, and establishing mechanical contact between the needle and the end of the inner conductor;
   pivoting the manipulation device about a pivot axis wherein the pivot axis extends essentially perpendicular to the axial direction of the end of the sheathed cable;
   gripping the end of the inner conductor by means of the inner conductor gripper;
   inserting the end of the inner conductor into a holding device of a fastening device;
   selecting a previously defined or definable inner conductor from the plurality of inner conductors; and
   rotating the fastening device for the inner conductor taking into account the selected inner conductor.

4. The method according to claim 3, wherein the introduction of the inner conductor into the holding device comprises:
   pivoting the manipulation device about the pivot axis into an end position such that the end of the inner conductor is brought into the region of the holding device of the fastening device; and
   moving the end of the inner conductor relative to the holding device into a holding position for the end of the inner conductor.

5. A device for manipulating an inner conductor from a plurality of inner conductors at a stripped end of a sheathed cable comprising:
   a manipulation device, which is pivotable from an initial position around a pivot axis, wherein the pivot axis extends essentially perpendicularly to the axial direction of the end of the sheathed cable, and
   a rotation device for rotating a fastening device for the inner conductor of the sheathed cable,
   wherein the end of the sheathed cable is alignable relative to the manipulation device in a plane which is essentially perpendicular to the axis of the end of the sheathed cable; and
   wherein the manipulation device comprises:
      a needle which is movable towards an end of the inner conductor along a needle axis in the initial position of the manipulation device; and
      an inner conductor gripper for gripping the end of the inner conductor.

6. The device according to claim 5, wherein the rotation device selectively rotates the fastening device for the inner conductor of the sheathed cable.

7. A device for manipulating an inner conductor from a plurality of inner conductors at a stripped end of a sheathed cable comprising:
   a manipulation device, which is pivotable from an initial position around a pivot axis, wherein the pivot axis extends essentially perpendicularly to the axial direction of the end of the sheathed cable, and
   a collection gripper for gripping a plurality of the inner conductors at the end of the sheathed cable,
   wherein the end of the sheathed cable is alignable relative to the manipulation device in a plane which is essentially perpendicular to the axis of the end of the sheathed cable; and
   wherein the manipulation device comprises:
      a needle which is movable towards an end of the inner conductor along a needle axis in the initial position of the manipulation device; and
      an inner conductor gripper for gripping the end of the inner conductor.

8. The device according to claim 7, wherein the collection gripper grips all of the inner conductors at the end of the sheathed cable.

* * * * *